(12) United States Patent
Letunov et al.

(10) Patent No.: US 8,275,017 B2
(45) Date of Patent: Sep. 25, 2012

(54) METHOD OF PACKET TRANSMISSION AND RECEPTION OF QUADRATURE AMPLITUDE MODULATED SIGNALS IN A FREQUENCY HOPPING RADIO SYSTEM

(75) Inventors: Leonid Letunov, Gomel (BY); Aleksandr Grigorjev, Gomel (BY)

(73) Assignee: Modesat Communications OU, Tallinn (EE)

( * ) Notice: Subject to any disclaimer, the term of this patent is extended or adjusted under 35 U.S.C. 154(b) by 443 days.

(21) Appl. No.: 12/701,494

(22) Filed: Feb. 5, 2010

(65) Prior Publication Data

US 2010/0195701 A1 Aug. 5, 2010

Related U.S. Application Data

(60) Provisional application No. 61/150,105, filed on Feb. 5, 2009.

(51) Int. Cl.
*H04B 1/00* (2006.01)
(52) U.S. Cl. ........ 375/135; 375/132; 375/367; 332/103; 370/912

(58) Field of Classification Search .................. None
See application file for complete search history.

(56) References Cited

U.S. PATENT DOCUMENTS

| | | | |
|---|---|---|---|
| 5,537,434 A | 7/1996 | Persson et al. | |
| 5,586,141 A | 12/1996 | Ashdown et al. | |

FOREIGN PATENT DOCUMENTS

WO 2005096539 A1 10/2005

*Primary Examiner* — David C. Payne
*Assistant Examiner* — Adolf Dsouza
(74) *Attorney, Agent, or Firm* — Patentbar International PC

(57) ABSTRACT

The invention achieves carrier and clock frequency synchronization in QAD packet communications systems. The invention involves using frequency-hopping radio systems that use pseudo-noise data sequences to mark the beginning of data transmissions and carrier frequency switches. The invention involves transmitting in each of the quadrature channels at an initial carrier frequency a first signal over consecutive time intervals and after transmitting the first signal, transmitting in each of the quadrature channels at a second carrier frequency a second signal over consecutive time intervals.

2 Claims, No Drawings

US 8,275,017 B2

METHOD OF PACKET TRANSMISSION AND RECEPTION OF QUADRATURE AMPLITUDE MODULATED SIGNALS IN A FREQUENCY HOPPING RADIO SYSTEM

RELATED APPLICATIONS

This application claims the benefit under 35 USC 119(e) of U.S. Provisional Application No. 61/150,105 filed on Feb. 5, 2009, which is incorporated herein by reference in its entirety.

FIELD OF THE INVENTION

The invention is in the area of communication technology and more particularly, relates to methods for increasing the bandwidth capacity of a communication channel in a frequency hopping radio system.

BACKGROUND OF THE INVENTION

Several methods for providing packet communications are known (see the U.S. Pat. Nos. 5,586,141 and 5,537,434). However, these methods generally suffer from significant bandwidth capacity losses related to the large amount of time required for achieving clock and carrier frequency synchronization during reception of each transmitted data packet.

Also known is a method of signal transmission and reception that achieves carrier and clock frequency synchronization regardless of the order of the QAM modulation scheme used the International Patent Publication No. WO 2005/096539. This method does not require any differential coding. The system of carrier and clock frequency extraction is linear as a result of the introduction of a specific pilot tone. However, this method is intended for continuous mode transmission systems and is not immediately applicable for packet communications in carrier frequency hopping systems.

There is therefore a need for methods that increase the bandwidth capacity of carrier frequency hopping systems.

SUMMARY OF THE INVENTION

The current invention comprises a method to decrease the amount of time required to achieve carrier and clock frequency synchronization in packet communications systems, using the positive elements of the method described in the International Patent Publication No. WO 2005/096539 which is hereby incorporated by reference herein in its entirety.

One embodiment of the present invention is a method of transmitting frequency-hopping quadrature amplitude modulation data signals, comprising: transmitting in each of the quadrature channels at an initial carrier frequency $f_0$ a first signal over consecutive time intervals $T_{OS}$, $T_{PN1}$, $T_{01}$ and $T_{PN2}$ comprising: transmitting during the time interval $T_{OS}$ only a first pilot tone signal $$A_0 \cdot \operatorname{Sin}\left(2\pi \frac{f_S}{2} t\right),$$

where $f_S$ is a symbol clock frequency and $A_0$ is an amplitude, at a power equal to a total signal power during data transmission; transmitting during the time interval $T_{PN1}$ a sum of a second pilot tone signal $$A_1 \cdot \operatorname{Sin}\left(2\pi \frac{f_S}{2} t\right),$$

where an amplitude $A_1$ is between $0.05 A_0$ and $0.1 A_0$, and of a first pseudo noise sequence PN1 multiplied by a cosine signal $$\operatorname{Cos}\left(2\pi \frac{f_S}{2} t\right);$$

transmitting during the time interval $T_{01}$ a sum of the second pilot tone signal and of a first symbol data sequence multiplied by the cosine signal; transmitting during the time interval $T_{PN2}$, a sum of the second pilot tone signal and of a second pseudo noise sequence PN2 multiplied by the cosine signal; after transmitting the first signal, transmitting in each of the quadrature channels at an second carrier frequency $f_i$ a second signal over consecutive time intervals $T_S$, $T_{PN1}$, $T_1$ and $T_{PN2}$ comprising: transmitting during the time interval $T_S$ only the first pilot tone signal at the power equal to the total signal power during data transmission; transmitting during the time interval $T_{PN1}$ a sum of the second pilot tone signal, and of the first pseudo noise sequence PN1 multiplied by the cosine signal; transmitting during the time interval $T_1$ a sum of the second pilot tone signal and of a second symbol data sequence multiplied by the cosine signal; and transmitting during the time interval $T_{PN2}$, a sum of the second pilot tone signal and of the second pseudo noise sequence PN2 multiplied by the cosine signal; wherein $T_S$ is shorter than $T_{OS}$ and $T_1$ is longer than $T_{01}$; and wherein the second carrier frequency $$f_i = f_0 + \frac{c_i}{m_i} \cdot \frac{f_S}{2},$$

where $c_i$ is a positive or negative integer and $m_i$ is a positive integer.

Another embodiment of the present invention is a method of receiving frequency-hopping quadrature amplitude modulation data signals, comprising: demodulating a received signal and forming two quadrature channels; receiving a pilot signal $$A_0 \cdot \operatorname{Sin}\left(2\pi \frac{f_S}{2} t\right),$$

where $f_S$ is a symbol clock frequency, during a time interval $T_{OS}$, for synchronization of a carrier frequency and a clock frequency; in each of the quadrature channels, during a time interval $T_{PN1}$, after the $T_{OS}$, multiplying the received signal by a cosine signal $$\operatorname{Cos}\left(2\pi \frac{f_S}{2} t\right)$$

and applying a filter corresponding to a first pseudo noise sequence PN1 to determine a starting time of a first transmitted data symbol sequence; in each of the quadrature channels, during a time interval $T_{01}$, after the $T_{PN1}$, multiplying the received signal by the cosine signal to recover the first transmitted data symbol sequence; in each of the quadrature channels, during a time interval $T_{PN2}$, after the $T_{01}$, multiplying the received signal by the cosine signal and applying a filter corresponding to a second pseudo noise sequence PN2 to determine a moment of a first carrier frequency switch; switching carrier frequency at the moment of the first carrier frequency switch; after the first carrier frequency switch, receiving the pilot signal, during a time interval $T_S$, for synchronization of the carrier frequency and the clock frequency; in each of the quadrature channels, during a time interval $T_{PN1}$, after the $T_S$, multiplying the received signal by the cosine signal and applying the filter corresponding to the PN1 to determine a starting time of a second transmitted data symbol sequence; in each of the quadrature channels, during a time interval $T_1$, after the $T_{PN1}$, multiplying the received signal by the cosine signal to recover the second transmitted data symbol sequence; and in each of the quadrature channels, during a time interval $T_{PN2}$, after the $T_1$, multiplying the received signal by the cosine signal and applying the filter corresponding to the PN2 to determine a moment of a second carrier frequency switch; wherein during all the time intervals except $T_{0S}$ synchronizing the carrier frequency and a symbol frequency is using a pilot signal $$A_1 \cdot \operatorname{Sin}\left(2\pi \frac{f_S}{2} t\right);$$

and wherein $T_S$ is shorter than $T_{0S}$ and $T_1$ is longer than $T_{01}$.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

DETAILED DESCRIPTION OF THE PREFERRED EMBODIMENTS

As in the International Patent Publication No. WO 2005/096539, the carrier and clock frequency synchronization is carried out with the help of a pilot tone of the form $$A_1 \cdot \sin 2\pi \frac{f_S}{2} t,$$

where $A_1$ is the pilot tone amplitude, which defines its power and which amounts to only a small percentage of the main signal power;

$$\frac{f_S}{2}$$

is the pilot tone frequency, equal to one half of the symbol clock frequency.

The goal of the invention is achieved as follows. The time interval T, needed to transmit a data packet, is presented as the sum of the following intervals:

at initial frequency $f_0$ the packet length is equal to $T=T_{0S}+T_{PN1}+T_{01}+T_{PN2}$ at all other frequencies the packet length is equal to $T=T_S+T_{PN1}+T_1+T_{PN2}$ In the above $T_{0S}$ and $T_S$ are the preambles required for carrier and clock frequency synchronization, and $T_{01}$ and $T_1$ are the packet data payloads. The overall packet stream is formed by the initial packet at frequency $f_0$ followed by a number of additional packets at other frequencies defined below. The pilot-assisted synchronization method from [3] is used to reduce the initial and subsequent packet synchronization times $T_{0S}$ and $T_S$, allowing reduction of the overhead and therefore to achieve transmission of more user data symbols in each packet period T.

Within the intervals $T_{0S}$ and $T_S$ a pilot tone of the form $$A_0 \cdot \sin 2\pi \frac{f_S}{2} t$$

is transmitted in both quadrature channels, where $f_S$ is the symbol clock frequency and $A_0$ is the pilot tone amplitude, providing a pilot tone power that is equal to the total signal power during data message transmission. Introduction of this pilot tone reduces the time to acquire synchronization by factors of ten.

As known in the pertinent art, a pseudo-noise code is one that has a spectrum similar to a random sequence of bits but is deterministically generated.

During the interval $T_{PN1}$, a PN (pseudo noise) sequence PN1 with a minimum base of 50 is transmitted. This PN1 sequence is transmitted in both quadrature channels. During this interval $T_{PN1}$ the pilot tone is also transmitted, however its amplitude is reduced to $A_1=(0.1-0.05) \cdot A_0$. The PN1 sequence samples are orthogonal to the pilot tone $$A_1 \cdot \operatorname{Sin}\left(2\pi \frac{f_S}{2} t\right).$$

The sequence PN1 is necessary to define the exact starting time of the actual user data transmission. To eliminate phase ambiguity the PN1 samples are multiplied by the signal $$\operatorname{Cos}\left(2\pi \frac{f_S}{2} t\right)$$

before being added to the pilot tone.

The interval $T_{PN1}$ is followed by the interval $T_{01}$ or $T_1$, within which data symbol samples are transmitted, after multiplication by $$\operatorname{Cos}\left(2\pi \frac{f_S}{2} t\right)$$

and added to $$A_1 \cdot \operatorname{Sin}\left(2\pi \frac{f_S}{2} t\right).$$

The symbol samples are orthogonal to the pilot tone $$A_1 \cdot \operatorname{Sin}\left(2\pi \frac{f_S}{2} t\right).$$

Within the interval $T_{01}$ the symbol samples of service data may be transmitted, for example: modulation type, coding rate, combination code of frequency changes and other data. The transmission of data symbol samples is carried out within the interval $T_1$.

The interval $T_{01}$ or $T_1$ is followed by the interval $T_{PN2}$, during which a PN sequence PN2 is added to the pilot tone $$A_1 \cdot \operatorname{Sin}\left(2\pi \frac{f_S}{2} t\right).$$

The final moment of the PN2 sequence defines the moment of a carrier frequency value change. To eliminate phase ambiguity the PN2 sequence samples are multiplied by the signal $$\operatorname{Cos}\left(2\pi \frac{f_S}{2} t\right)$$

before being added to the pilot tone.

The new carrier frequency value at the end of each of the following data packet transmission intervals $T_i$ is determined such that in the i-th interval the carrier frequency is equal to $$f_i = f_0 + \frac{c_i}{m_i} \cdot \frac{f_S}{2}$$

where $c_i$ is a positive or negative integer and $m_i$ is a positive integer. The exact values of $c_i$ and $m_i$ are predetermined and known to both transmitter and receiver. Knowledge of this predetermined law governing carrier frequency changes on the receiving end enables, knowing the exact values of $f_0$ and $f_S$, prediction in the receiving equipment of the exact carrier frequency value corresponding to the i-th receiving interval. This results in a significant reduction (by factors of 10 or more) of the synchronization acquisition interval $T_S$ when the packet transmission is made at carrier frequencies other than $f_0$. By this method, the increase of packet transmission channel bandwidth is achieved.

On the receiver side the carrier frequency $f_0$ is generated. After the signal $$A_0 \cdot \sin 2\pi \frac{f_S}{2} t$$

has been received during the interval $T_{OS}$, receiver side synchronization of carrier and clock frequencies occurs. After this, within the interval $T_{PN1}$ the multiplication of input signal by the signal $$\operatorname{Cos}\left(2\pi \frac{f_S}{2} t\right)$$

takes place, and using a filter matched to the PN1 sequence, the exact moment the data symbol sequence commences in the received signal is determined. The PN1 sequence base is equal to 50 or greater, and the reception of the PN1 sequence is realized in the both quadrature channels. The use of a filter matched to the PN1 sequence to process the received signal within the interval $T_{PN1}$ makes it possible to obtain a sample with a signal to noise ratio higher than at the input of the matched filter, by 20 dB at the end of the interval $T_{PN1}$. This allows precise determination of the start of the data sequence.

The input signal is then multiplied by the signal $$\operatorname{Cos}\left(2\pi \frac{f_S}{2} t\right)$$

within the interval $T_{01}$, following the interval $T_{PN1}$, resulting in the service data symbol sequence.

Within the interval $T_{PN2}$, following the interval $T_{01}$, the input signal is multiplied by the signal $$\operatorname{Cos}\left(2\pi \frac{f_S}{2} t\right)$$

and with the help of a filter matched to the PN2 sequence, during the time $T_{PN2}$ the exact moment of switching carrier frequency is determined. Its new value is determined according to the predetermined known parameters $c_i$ and $m_i$.

Symbol and frequency synchronization in all intervals except for $T_{OS}$ is performed with the help of the pilot signal $$A_1 \cdot \operatorname{Sin}\left(2\pi \frac{f_S}{2} t\right).$$

Thus, if the interval needed to transmit data at a carrier frequency $f_0$ is equal to $T = T_{OS} + T_{PN1} + T_{01} + T_{PN2}$, at other carrier frequencies equal to $$f_0 + \frac{c_i}{m_i} \cdot \frac{f_S}{2}$$

it will be equal to $T = T_S + T_{PN1} + T_1 + T_{PN2}$; at this $T_S \ll T_{OS}$, which allows a substantial increase in the carrier frequency bandwidth capacity.

For example, if
$T_{OS} = 2 \cdot 10^3$ clock frequency samples,
$T_{PN_1} = 50$ clock frequency samples,
$T_{01} = 4 \cdot 10^3$ clock frequency samples,
$T_{PN_2} = 50$ clock frequency samples,
then the packet length T is equal to 6100 samples and at the initial frequency $f_0$ the number of data samples is 4000.

At other carrier frequencies with $T_S$ equal, for example, to 100 clock frequency samples, and with the total packet length T unchanged, $T_1$ will be equal to 5900 data samples. These packets contain 47.5% more data than the initial packet and the gain is therefore a factor of 1.475 times.

It is noted that the practical realization of the proposed method for increasing the bandwidth capacity of a communication channel in a frequency hopping radio system requires traditional digital signal processing operations such as generation of harmonic signals, multiplication and multiplexing of signals, filtering etc.

Although this invention is described with respect to a set of aspects and embodiments, modifications thereto will be apparent to those skilled in the art. The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of transmitting frequency-hopping quadrature amplitude modulation data signals, comprising:

transmitting in each of the quadrature channels at an initial carrier frequency $f_0$ a first signal over consecutive time intervals $T_{0S}$, $T_{PN1}$, $T_{01}$ and $T_{PN2}$ comprising:

transmitting during the time interval $T_{0S}$ only a first pilot tone signal $$A_0 \cdot \mathrm{Sin}\left(2\pi \frac{f_S}{2} t\right),$$

where $f_S$ is a symbol clock frequency and $A_0$ is an amplitude, at a power equal to a total signal power during data transmission;

transmitting during the time interval $T_{PN1}$ a sum of a second pilot tone signal $$A_1 \cdot \mathrm{Sin}\left(2\pi \frac{f_S}{2} t\right),$$

where an amplitude $A_1$ is between $0.05\, A_0$ and $0.1\, A_0$, and of a first pseudo noise sequence PN1 multiplied by a cosine signal $$\mathrm{Cos}\left(2\pi \frac{f_S}{2} t\right);$$

transmitting during the time interval $T_{01}$ a sum of the second pilot tone signal and of a first symbol data sequence multiplied by the cosine signal;

transmitting during the time interval $T_{PN2}$, a sum of the second pilot tone signal and of a second pseudo noise sequence PN2 multiplied by the cosine signal;

after transmitting the first signal, transmitting in each of the quadrature channels at an second carrier frequency $f_i$ a second signal over consecutive time intervals $T_S$, $T_{PN1}$, $T_1$ and $T_{PN2}$ comprising:

transmitting during the time interval $T_S$ only the first pilot tone signal at the power equal to the total signal power during data transmission;

transmitting during the time interval $T_{PN1}$ a sum of the second pilot tone signal, and of the first pseudo noise sequence PN1 multiplied by the cosine signal;

transmitting during the time interval $T_1$ a sum of the second pilot tone signal and of a second symbol data sequence multiplied by the cosine signal; and transmitting during the time interval $T_{PN2}$, a sum of the second pilot tone signal and of the second pseudo noise sequence PN2 multiplied by the cosine signal;

wherein $T_S$ is shorter than $T_{0S}$ and $T_1$ is longer than $T_{01}$; and wherein the second carrier frequency $$f_i = f_0 + \frac{c_i}{m_i} \cdot \frac{f_S}{2},$$

where $c_i$ is a positive or negative integer and $m_i$ is a positive integer.

2. A method of receiving frequency-hopping quadrature amplitude modulation data signals, comprising:

demodulating a received signal and forming two quadrature channels;

receiving a pilot signal $$A_0 \cdot \mathrm{Sin}\left(2\pi \frac{f_S}{2} t\right),$$

where $f_S$ is a symbol clock frequency, during a time interval $T_{0S}$, for synchronization of a carrier frequency and a clock frequency;

in each of the quadrature channels, during a time interval $T_{PN1}$, after the $T_{0S}$, multiplying the received signal by a cosine signal $$\mathrm{Cos}\left(2\pi \frac{f_S}{2} t\right)$$

and applying a filter corresponding to a first pseudo noise sequence PN1 to determine a starting time of a first transmitted data symbol sequence;

in each of the quadrature channels, during a time interval $T_{01}$, after the $T_{PN1}$, multiplying the received signal by the cosine signal to recover the first transmitted data symbol sequence;

in each of the quadrature channels, during a time interval $T_{PN2}$, after the $T_{01}$, multiplying the received signal by the cosine signal and applying a filter corresponding to a second pseudo noise sequence PN2 to determine a moment of a first carrier frequency switch;

switching carrier frequency at the moment of the first carrier frequency switch;

after the first carrier frequency switch, receiving the pilot signal, during a time interval $T_S$, for synchronization of the carrier frequency and the clock frequency;

in each of the quadrature channels, during a time interval $T_{PN1}$, after the $T_S$, multiplying the received signal by the cosine signal and applying the filter corresponding to the PN1 to determine a starting time of a second transmitted data symbol sequence;

in each of the quadrature channels, during a time interval $T_1$, after the $T_{PN1}$, multiplying the received signal by the cosine signal to recover the second transmitted data symbol sequence; and in each of the quadrature channels, during a time interval $T_{PN2}$, after the $T_1$, multiplying the received signal by the cosine signal and applying the filter corresponding to the PN2 to determine a moment of a second carrier frequency switch;

wherein during all the time intervals except $T_{OS}$ synchronizing the carrier frequency and a symbol frequency is using a pilot signal $$A_1 \cdot \mathrm{Sin}\left(2\pi \frac{f_S}{2} t\right);$$

and wherein $T_S$ is shorter than $T_{OS}$ and $T_1$ is longer than $T_{O1}$.

* * * * *